(12) United States Patent
Azima et al.

(10) Patent No.: US 6,377,695 B1
(45) Date of Patent: Apr. 23, 2002

(54) TRIM PANEL COMPRISING AN INTEGRAL ACOUSTIC SYSTEM

(75) Inventors: Henry Azima, Cambridge; Martin Colloms, London; Christien Ellis, Hertfordshire, all of (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/501,770

(22) Filed: Feb. 10, 2000

Related U.S. Application Data

(63) Continuation of application No. PCT/GB98/02533, filed on Aug. 24, 1998.

(30) Foreign Application Priority Data

Sep. 3, 1997 (GB) ............................................. 9718627
Apr. 7, 1998 (GB) ............................................. 9807318

(51) Int. Cl.[7] ............................................. H04R 25/00
(52) U.S. Cl. ........................ 381/152; 381/423; 381/426
(58) Field of Search ............................... 381/302, 152, 381/86, 87, 431; 181/150

(56) References Cited

U.S. PATENT DOCUMENTS

| | | | |
|---|---|---|---|
| 3,422,921 A | 1/1969 | Warnaka | 181/33 |
| 4,392,027 A | 7/1983 | Bock | 179/181 |
| 4,514,599 A | 4/1985 | Yanagishima et al. | 179/181 |
| 4,551,849 A | 11/1985 | Kasai et al. | 381/86 |
| 4,720,867 A | 1/1988 | Imai et al. | 381/86 |
| 4,751,419 A | 6/1988 | Takahata | 310/324 |
| 5,901,231 A | 5/1999 | Parrella et al. | 381/86 |

FOREIGN PATENT DOCUMENTS

| | | |
|---|---|---|
| JP | 4-97700 | 3/1992 |
| WO | WO 97/09840 | 3/1997 |
| WO | WO 97/09843 | 3/1997 |
| WO | WO 97/09844 | 3/1997 |
| WO | WO 97/16048 | 5/1997 |
| WO | WO 98/13942 | 4/1998 |

OTHER PUBLICATIONS

U.S. application No. 09/029349, Azima et al., filed Sep. 2, 1996.
U.S. application No. 09/398,057, Azima et al., filed Sep. 17, 1999.
Patent Abstracts of Japan, vol. 007, No. 020, Jan. 26, 1983 & JP 57 175444 (Nissan Jidosha KK), Oct. 28, 1982.
Patent Abstracts of Japan, vol. 007, No. 020, Jan. 26, 1983 & JP 57 175445 (Nissan Jidosha KK), Oct. 28, 1982.
Patent Abstracts of Japan, vol. 006, No. 194, Oct. 2, 1982 & JP 57 104396 (Nissan Motor Co. Ltd.), Jun. 29, 1982.

*Primary Examiner*—Sinh Tran
(74) *Attorney, Agent, or Firm*—Foley & Lardner

(57) ABSTRACT

A trim panel, e.g., a roof lining for a vehicle passenger compartment, characterized in that the trim panel comprises an integral acoustic radiator and a vibration exciter mounted on the radiator to launch bending waves into the radiator to cause it to resonate to produce an acoustic output. The acoustic radiator has a periphery which is integral with the radiator and the trim panel.

33 Claims, 5 Drawing Sheets

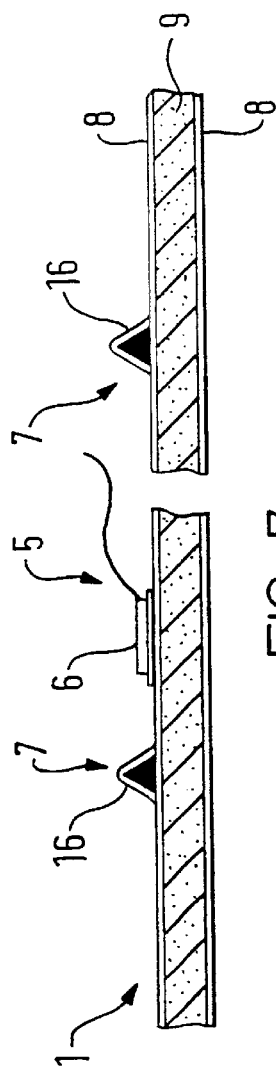
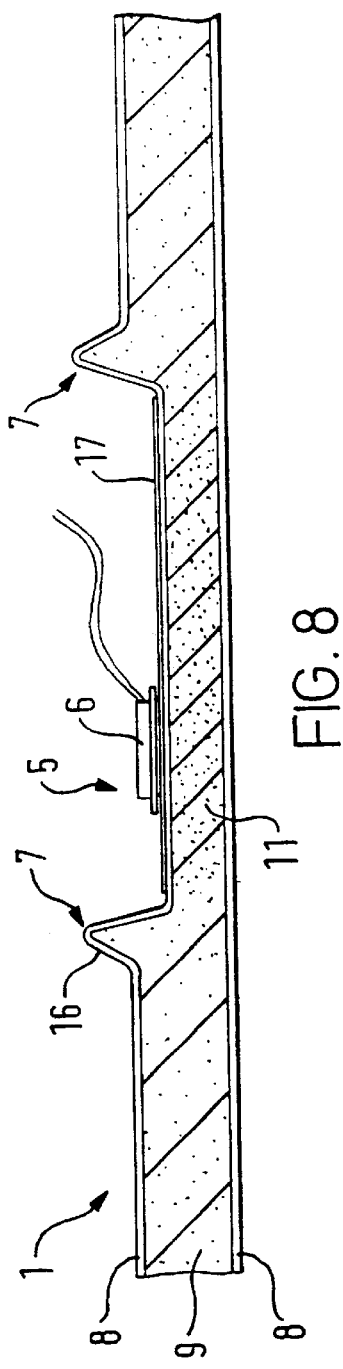
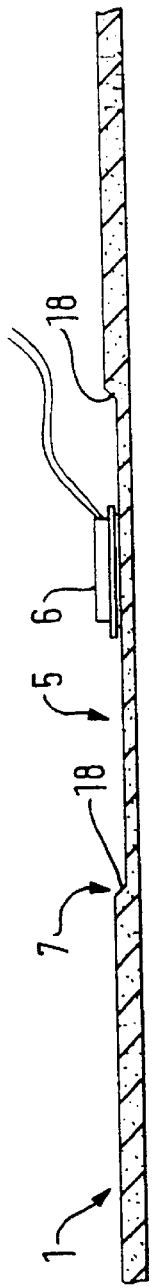

TRIM PANEL COMPRISING AN INTEGRAL ACOUSTIC SYSTEM

This application is a continuation of International application No. PCT/GB98/02533, filed Aug. 24, 1998.

DESCRIPTION

1. Technical Field

The invention relates to trim panels, e.g. for the passenger cabin of a vehicle such as an automobile and more particularly to trim panels incorporating loudspeakers.

2. Background Art

A number of approaches have been tried for achieving good quality sound reproduction in vehicles such as automobiles. Conventional pistonic loudspeakers of good quality, efficiency and satisfactory loudness use large magnets driving cone diaphragms resulting in an assembly including the loudspeaker chassis or basket of appreciable depth typically 6 to 10 cm.

Space is limited in a vehicle interior with little scope for sealed or tuned box volumes typically used for cone-type pistonic speakers. Often speakers have to be installed in non optimal positions well away from the head locations of the occupants, for example, on the rear parcel shelf, on the lower door panels out of the way of the window winder mechanism, or at the extremities of the dashboard, to supplement the sound from the poorly located door speakers. Six speaker arrangements are typical in an attempt to address the problems caused by poor location driven by the need to find significant panel depth to locate conventional speaker drivers.

Rear parcel shelf speakers are located behind the passengers, far from the front seats and are impaired by proximity to the cavity formed by the rear window glass and the parcel shelf. Potentially each such speaker is also located too near the nearest passenger resulting in a local excess of loudness.

Door-mounted speakers are placed in the noisiest part of the vehicle and suffer from vibration, door panel resonance, road noise transmission and engine noise. They are almost inaudible for rear seat passengers and are placed well off axis for front seat occupants. In addition their acoustic output may be severely obstructed by an occupant's leg(s).

A further pair of loudspeakers which may be located on the dashboard often suffer from poor mounting technique impairing the frequency response and endure local reflections from the windscreen glass. They are inadequately placed to give satisfactory spread of the two stereo channels. Each is usually too near to the nearest occupant.

In our U.S. patent application No. Ser. No. 08/707,012 filed Sep. 3, 1996 these problems are addressed with the object of giving greater aural comfort, reduced installation cost, greater signal to noise ratio, greater efficiency, more uniform stereo and multi channel sound for all the vehicle occupants, reduced weight, simplified vehicle wiring and potentially higher quality sound.

Distributed mode bending wave resonant panel loudspeakers as described in our application Ser. No. 08/707,012 use a diaphragm which is usually flat and is relatively slim, driven by a low excursion low profile electromechanical transducer, typically electrodynamic although other types are suitable including piezo, if the acoustic characteristics of the radiating panel are satisfactorily matched to the type of transducer and to the available amplification.

DISCLOSURE OF INVENTION

From one aspect the present invention is a vehicle having a passenger compartment, a trim panel, e.g. a roof lining, forming a lining in the passenger compartment and a loudspeaker in the passenger compartment, characterised in that the loudspeaker is in the trim panel and comprises an integral resonate acoustic radiator and a vibration exciter mounted on the radiator to launch bending waves into the radiator to cause it to resonant to produce an acoustic output, and a radiator periphery integral with the radiator and the surrounding trim panel. The integral periphery may be moulded integrally with the trim panel or may be permanently fixed to the trim panel to make it integral therewith. Equally, the acoustic radiator may be moulded integrally with the trim panel or may be permanently fixed thereto to make it integral therewith. Possibly the periphery could be moulded integrally with the trim panel and the acoustic radiator could be permanently fixed to the trim panel, e.g. by adhesive means, to make it integral therewith.

The radiator may be of the same material as the trim panel or may comprise a stiff lightweight panel. The integral periphery may define a clamped edge termination for the radiator. The clamped edge termination may be formed by an integrally moulded stiffening rib surrounding the radiator.

The radiator may be stiffened by one or more ribs extending over its surface.

The vibration exciter may be inertial. The vibration exciter may be electrodynamic.

From another aspect the invention is a trim panel, e.g. a roof lining for a vehicle passenger compartment, characterised in that the trim panel comprises an integral acoustic radiator and a vibration exciter mounted on the radiator to launch bending waves into the radiator to cause it to resonate to produce an acoustic output, radiator periphery integral with the radiator and the surrounding trim panel.

The radiator may comprise a stiff lightweight panel.

The integral radiator periphery may define a clamped edge termination for the radiator. The clamped edge termination may be formed by an integrally moulded stiffening rib surround the radiator.

The radiator may be stiffened by at least one rib extending over its surface.

The vibration exciter may be inertial. The vibration exciter may be electrodynamic.

The trim panel may comprise a plurality of resonant radiators. Where the trim panel is a vehicle roof lining for a passenger compartment, a resonant radiator may be positioned adjacent to each passenger position in the compartment.

It is fundamental to the present invention that the designated sound radiating area is of the distributed mode type in the required frequency range. In contrast to other kinds of radiator, e.g. near pistonic and local area excited types which have essentially point source coherent radiation characteristics, the distributed mode type is excited over a significant area and has a diffuse non-directional output even at extreme off axis angles, without significant variation with frequency. This provides a good radiation pattern for the confined spaces within a vehicle passenger cabin.

The panel may be adapted to operate at least partly below coincidence frequency, and may be adapted to operate mainly or wholly below coincidence frequency.

The entire periphery of the acoustic member may be clamped or alternatively one or more edges of the member, e.g. a rectangular panel, may be clamped. Full clamping enables the design of the loudspeaker assembly to be predictable in mechanical terms, and also facilitates the creation of a loudspeaker assembly which is relatively robust in construction, compared to a resonant panel loudspeaker in which the panel edges are free or are resiliently suspended.

The clamping of the peripheral portion(s) or edge(s) of the acoustic member may be achieved in any desired manner e.g. by rigidly fixing the edge(s) to a frame or the like by means of an adhesive or by mechanical means e.g. involving clamping the edge(s) between frame members. The edge clamping may also be achieved by moulding techniques such as injection moulding of plastics materials by forming the edges of the member with integral thickened surround portions of sufficient rigidity to terminate edge movement of the acoustic member. Co-moulding of the acoustic member and the thickened edge may be appropriate. Such moulding techniques may be particularly suitable where the acoustic member is formed as a monolith and may be readily achievable in economic manner.

It will thus be appreciated that the term 'clamped edge' is intended to encompass all forms of edge restraint.

Clamping may also be used to define one acoustic member within another larger acoustic member. Thus a large acoustic panel Intended for mid/low frequency operation may be moulded to include a smaller high frequency acoustic panel defined by a clamped perimeter formed by stiffening ribs.

The clamping action can be designed to have a desired mechanical termination impedance to control the reverberation time within the acoustic member as an aid to control of the frequency response of the member especially at lower frequency registers by introducing suitable damping.

The acoustic member may be rectangular and the aspect ratio may be as described in patent application Ser. No. 08/707,012; the acoustic member may be of constant thickness; the bending stiffness of the acoustic member may be isotropic, the objective of these measures being to maximise modal density in the member for the reasons explained in patent application Ser. No. 08/707,012.

The clamping of the panel edges enables the use of relatively low stiffness panels which will assist in reducing the fundamental bending mode of the panel below levels achievable for stiffer panels. This may facilitate the enhancement of low frequency performance.

Thus, for example, where the range of stiffness for a practical example of a free edge panel of the kind described in patent application Ser. No. 08/707,012 may be of the order of 0.1 to 50 Nm, the stiffness of a clamped edge panel of the same general kind may be greater than 0.001 Nm. Also where the range of surface density of the said practical example of free edge panel may be 100 to 1000 g/m$^2$, the density of the clamped edge panel may be greater than 25 g/m$^2$. It will, however, be appreciated that significantly stiffer and/or denser materials may be employed for the acoustic panel where low frequency performance is not a requirement.

Consequences arising from edge clamping an acoustic member include:
1. the frequency of the first bending mode (fo) rises by about ten-fold, and
2. three lower modes, which are absent for a free boundary panel, become useful. These lower modes can be useful in recovering losses due to the raised fo. Indeed preliminary tests show that for an acoustic panel of given mechanical properties, edge clamping provides a significant gain in the low frequency acoustic energy output.

Also the use of panels or panel materials of relatively low rigidity may enable the coincidence frequency to be moved upwards, perhaps above the audio band, which may improve the uniformity of sound directivity from the panel. At the same time, with less rigid panels, the modal density in the lower registers may be augmented, with a consequent improvement in sound quality.

The radiating member may be excited in any of the ways suggested in patent application Ser. No. 08/707,012, e.g. by way of an inertial electro-mechanical exciter device. The or each exciter may be arranged to excite the radiating member at any suitable geometric position(s) on the acoustic member e.g. as disclosed in patent application Ser. No. 08/707,012 or otherwise, again with the objective of optimising modal density.

More than one such panel may be incorporated in the trim panel, e.g. a roof lining of a vehicle. With two panels these may be placed approximately half way between front and rear occupants serving them similarly well. A number of different arrangements are also possible, as follows:

1. Installed wide frequency range distributed mode panel operating alone as a two-speaker system.
2. Smaller distributed mode-speaker panels for mid and upper frequencies located in the roof section operating in conjunction with conventional cone speakers for low frequencies, e.g. door or rear parcel shelf, or box type sub woofers suitably installed.
3. Smaller distributed mode speaker panels according to paragraph 2 above, distributed in greater numbers for still better even sound distribution and/or to account for other installations in the vehicle roof e.g. a sunroof.
4. The installation may be visible with simple framing, fixed by screws or by self-locking clips commonly used in auto installations. Alternatively the roof lining may be made acoustically transparent in the region of the distributed mode loudspeaker, e.g. by choice of materials and/or micro perforation, facilitating the fixing of the panel speaker to the back of the lining for an invisible installation.
5. At lowest frequencies where the radiation efficiency of the panel speaker is reduced, the roof lining may then be used to maintain the acoustic output. This lining may be designed and fabricated to achieve an installed mechanical impedance and broad band low frequency resonances to act as a large area bending wave radiator adapted to the low frequency range. The distributed mode speaker panel may be coupled by a suitable terminating compliance to the perimeter of the speaker aperture so as to extend the influence of the driver transducer located on the distributed mode speaker panel to the acoustically operative region of the roof lining. At low frequencies, the distributed mode panel is relatively stiff and the primary coupled mechanical impedance at low frequencies is then the roof lining. This may be a light semi-flexible composite of bonded fibre or pulp of good damping, moderate mass and faced with a thin acoustic foam of 2 to 4 mm thickness and may be covered with a decorative fabric or soft perforated polymer film.
6. Fabrication techniques also allow for distributed mode speakers to be formed as a largely integral component of the roof lining. In design the speaker regions are designated and delineated by suitable perimeter compliance, e.g. slotting, grooving, ridging etc. of the structural backing. Distributed mode panel operation is obtained by additional treatment of the speaker regions, such as laminating skins, additional reinforcement, resin impregnation. The electromechanical vibration exciter may be mounted directly to the designated region at optimal distributed mode drive points, or via a coupling plate providing defined mechanical impedances to optimise the frequency characteristics and the blend between the mid treble speaker panel and the larger coupled radiator. By this means loudspeakers may be integrated directly in the fabrication of the roof lining, to provide an increased value sub-assembly for car component makers.

7. A region of the roof lining may be designed for distributed bending wave operation by suitable skin shape, ridging, area geometry design and may be driven directly by a low frequency electromechanical exciter while the mid and high frequencies may be reproduced by additional distributed mode speakers, separately made, excited and mounted in acoustically porous apertures in the roof lining compliantly mounted relative to their frame or perimeter.

Additionally these mid to high frequency distributed mode reproducers may also-be integrated with the lining by suitable delineation, compliant periphery, and/or local reinforcement techniques.

BRIEF DESCRIPTION OF DRAWINGS

The invention is diagrammatically illustrated, by way of example, in the accompanying drawings, in which:

FIG. 7 is a partial cross-sectional side view, generally corresponding to that of FIG. 6, of another embodiment of automobile roof or headlining;

FIG. 8 is a partial cross-sectional side view, generally corresponding to that of FIG. 7, of another embodiment of automobile roof or headlining, and FIG. 9 is a partial cross-sectional side view, generally corresponding to that of FIG. 6, of yet another embodiment of automobile roof or headlining.

BEST MODES FOR CARRYING OUT THE INVENTION

Figure 1:
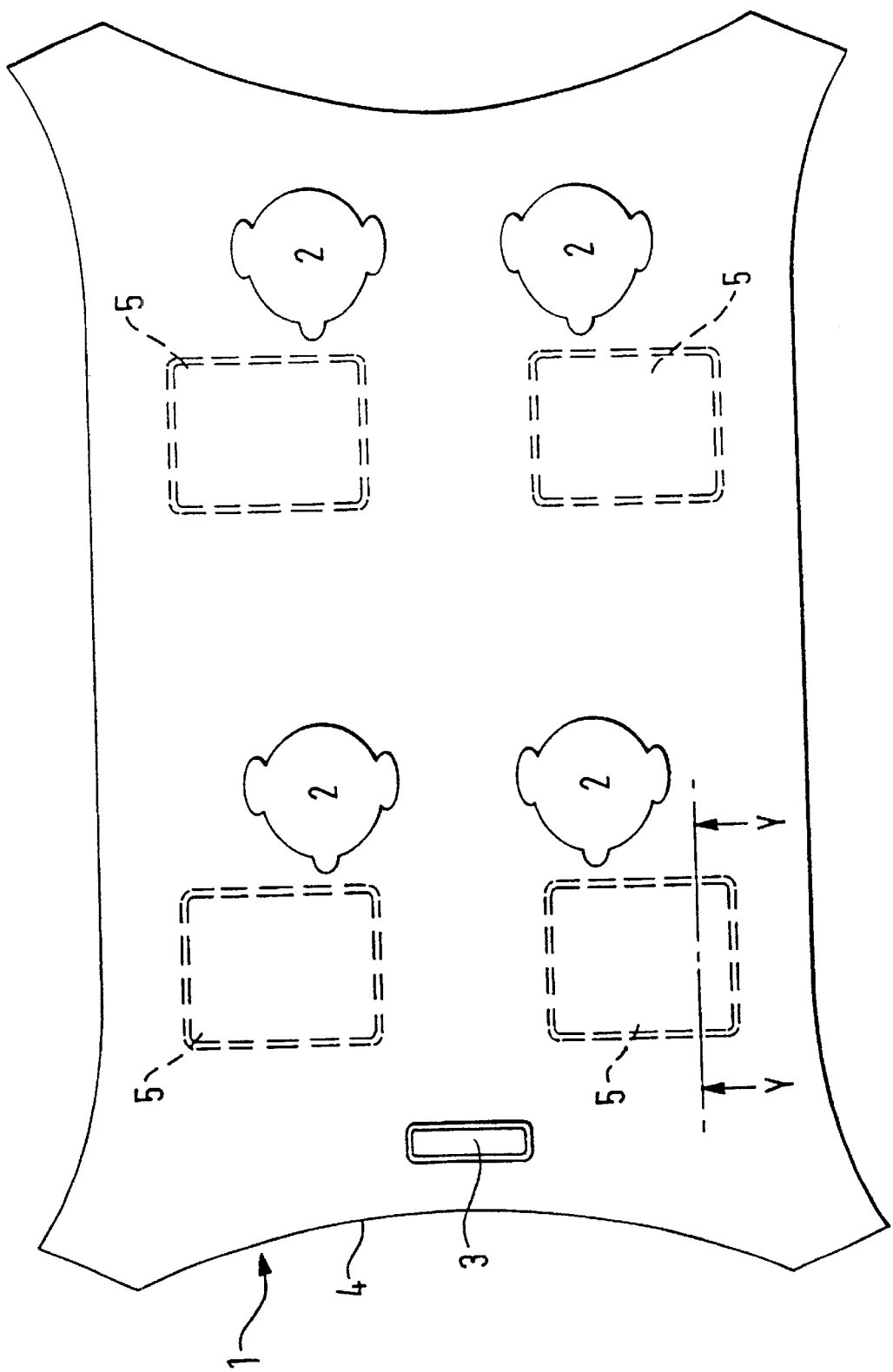
FIG. 1 is a plan view of the roof or headlining for an automobile having integral resonant panel loudspeakers.
Figure 2:
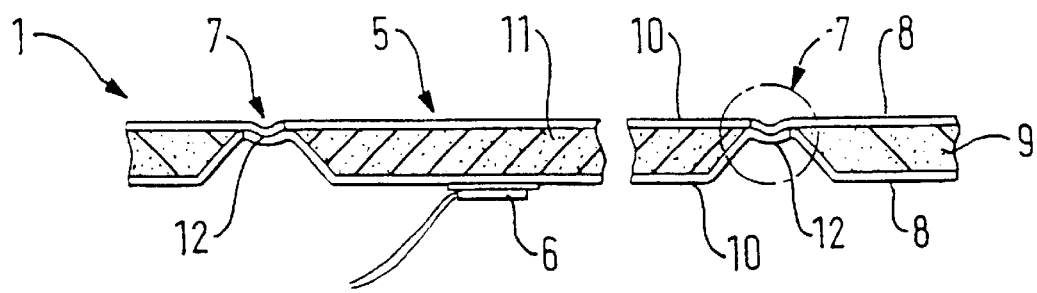
FIG. 2 is a partial cross-sectional view on the line Y—Y of FIG. 1.

In FIGS. 1 and 2 of the drawings, there is shown a trim panel in the form of a roof or headlining (1) for an automobile (not shown) in which the relative head positions of four passengers or occupants (2) are shown. A roof light (3) is provided in the roof lining (1) near to its front end (4). Four similar distributed mode acoustic radiator loudspeakers (5), of the kind generally described in our patent application Ser. No. 08/707,012 are located in the roof lining so that respective ones of the radiators (5) are positioned adjacent to and slightly in front of the head of each occupant (2).

Figure 2A:
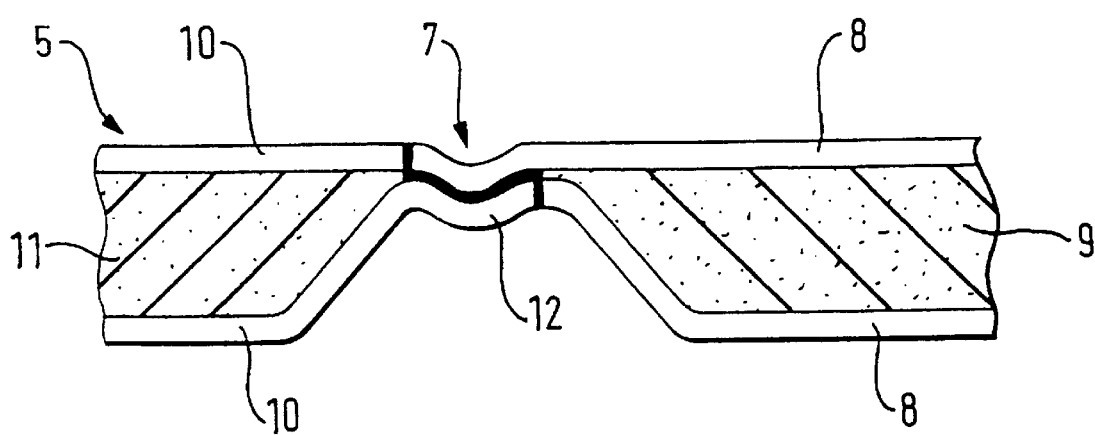
FIG. 2a is an enlarged view of a detail shown circled in FIG. 2.

As shown in FIGS. 2 and 2a, the radiators (5) are formed, e.g. moulded, integrally with the roof lining. A transducer or exciter (6), which may be an electrodynamic inertial device, is mounted on the radiator (5) to launch bending waves into the radiator to cause it to resonate to produce an acoustic output in the manner described in our patent application Ser. No. 08/707,012.

The edge (7) of each radiator panel is defined by a thinned portion of the roof lining to provide a clamped edge termination to each panel. The thinned portion (7) comprises a corrugation (12) extending round the edge of the panel.

As indicated, the roof lining comprises opposed skins (8) enclosing a resilient core (9), e.g. of a soft foam material. Similarly the radiator comprises opposed skins (10) but of high modulus, enclosing a core (11) which may be of rigid foam or honeycomb, to provide a stiff lightweight resonant radiator panel.

As shown in FIG. 2a, the upper skin (8) of the roof lining is overlapped with the lower skin (10) of the radiator at the corrugation (12) to provide a good bond between the radiator and the headlining whereby they are integrated.

Figure 3:
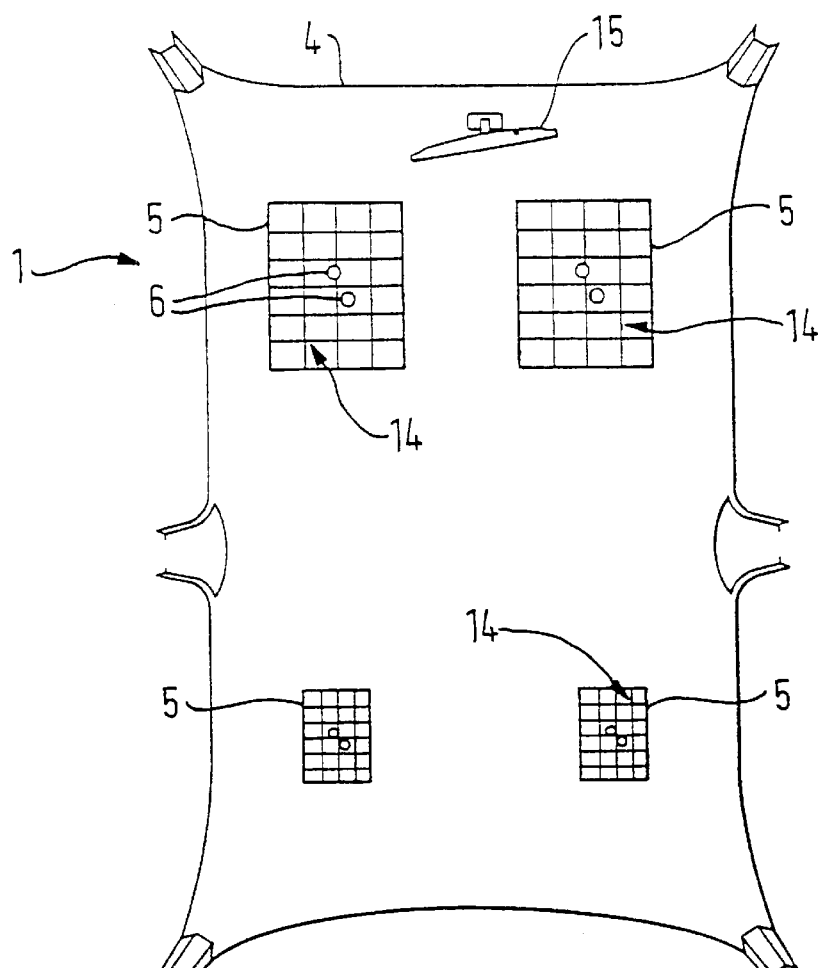
FIG. 3 is a plan view of second embodiment roof or headlining for an automobile.
Figure 4:
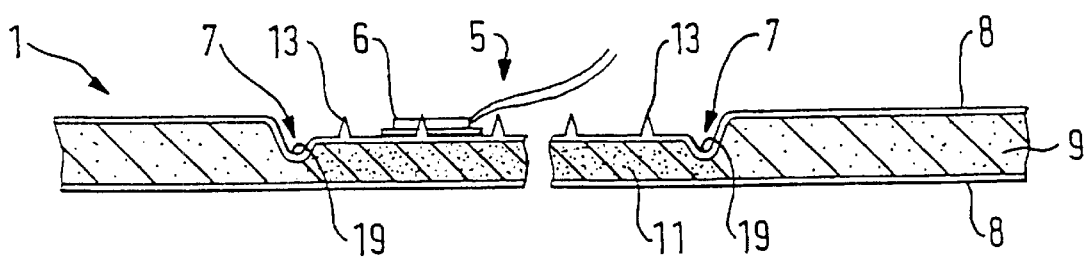
FIG. 4 is a partial cross-sectional side view of the embodiment of FIG. 2.

FIGS. 3 and 4 show a trim panel in the form of an automobile roof or headlining (1) which is generally similar to that of FIGS. 1 and 2. In this case a headlining laminate comprising opposed skins (8) enclosing a core (9) which is compressed in an area (5) forming a resonant panel loudspeaker e.g. of the kind described in patent application Ser. No. 08/707,012 to a reduced thickness indicated by the darker shading of the core material (11) and which is formed during the compression process forming the headlining with raised ribs (13) extending from the rear face and which form a grid pattern (14) as indicated in FIG. 3 to stiffen the loudspeaker panel as desired. The edge (7) of the loudspeaker panel is defined by a groove (19) formed by a greater degree of compression of the headlining laminate and which forms a clamped edge surround. A rear view mirror (15) is shown at the front (4) of the headlining (1).

Figure 5:
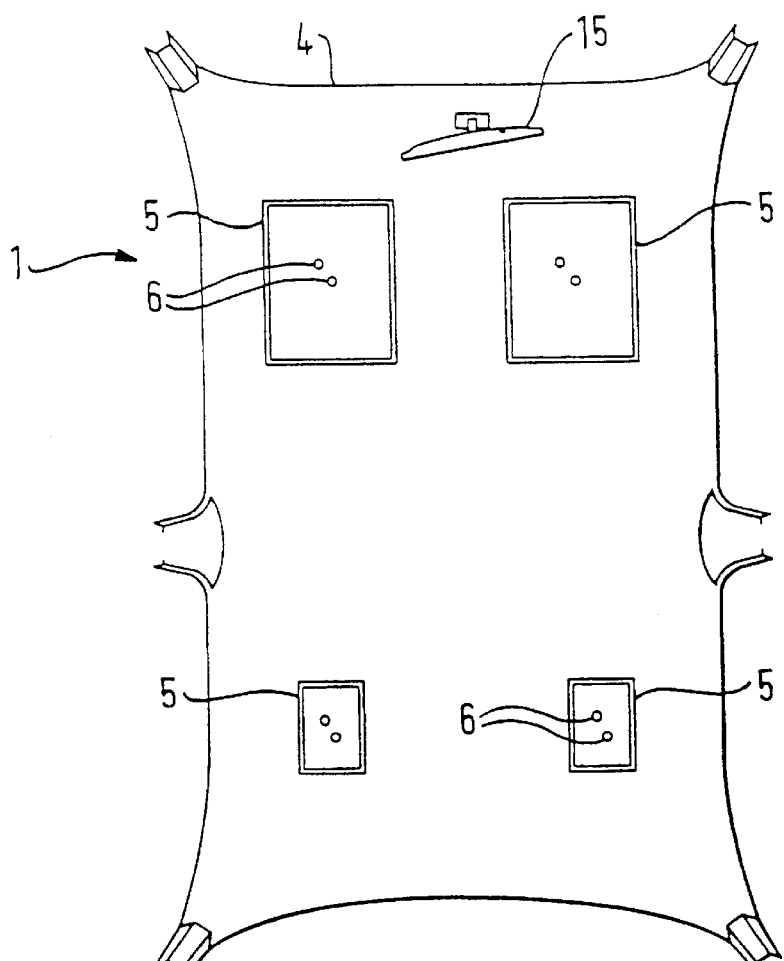
FIG. 5 is a plan view of a third embodiment of automobile roof or headlining.
Figure 6:
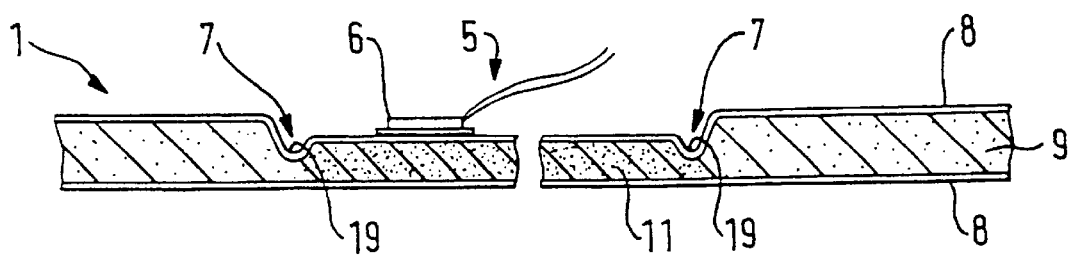
FIG. 6 is a partial cross-sectional side view of the embodiment of FIG. 5.

The headlining of FIGS. 5 and 6 is gene rally similar to that described in FIGS. 3 and 4 with the exception that the loudspeaker panels (5) are compressed from the general thickness of the headlining material and are each formed with a groove (19) surrounding and defining the edge (7) of the panel (5) and forming a clamped edge surround, but without forming a grid of raised stiffening ribs.

The headlining (1) of FIG. 7 is provided with upstanding rib formations (16) which surround and define resonant loudspeaker panels (5) within the general area of the headlining and which stiffen the edges (7) of the respective loudspeaker panel (5) to form a clamped surround. The upstanding rib formations (16) are formed in any convenient manner, e.g. by moulding, and are applied to one side of the headlining laminate (8,9) e.g. by means of an adhesive to integrate the rib formation with the headlining.

The headlining (1) of FIG. 8 is very similar to that of FIG. 7 in that it is formed with a clamped edge (7) formed by an upstanding stiffening rib (16) surrounding the radiator panel (5), and in this case that area of the headlining core (9) forming the radiator core (11) is compressed to be thinner than the general thickness of the headlining (1) as indicated by heavier shading. Also in this embodiment the raised rib (16) is moulded integrally with the headlining. It will be noted that the area of the radiator (5) bounded by the rib (16) is reinforced by a stiffening sheet (17) of any suitable material applied to a skin (8) of the laminate and bonded thereto.

The headlining of FIG. 9 comprises a thinned region and defining an acoustically active area of the headlining and forming a resonant loudspeaker panel (5), bounded by a step or lip (18) visible on the rear face of the headlining and which forms a clamped edge surround (7), e.g. of the kind defined in application Ser. No. 08/707,012. The headlining (1) may be of the laminated kind described above or may be a resin impregnated fibrous body.

INDUSTRIAL APPLICABILITY

It will be appreciated that although the invention has been particularly described with reference to a head or roof lining of an automobile, the invention applies also to other vehicles and to other objects requiring one or more trim panels as a lining. Also the invention applies to other trim panels within vehicles, e.g. to door panels, dashboards and rear parcels shelves.

What is claimed is:

1. A vehicle having a passenger compartment, a trim panel (1) lining at least a portion of the passenger compartment and comprising opposed skins (8) enclosing and laminated to a core (9), and a loudspeaker in the trim panel (1) comprising an integral resonant acoustic radiator (5), a vibration exciter (6) mounted on the radiator (5) to launch bending waves into the radiator (5) to cause it to resonate to produce an acoustic output, and a radiator periphery (7) integral with the radiator (5) and the surrounding trim panel (1), the radiator (5) having outside the radiator periphery (7).

2. A vehicle according to claim 1, wherein the radiator (5) comprises a stiff lightweight panel.

3. A vehicle according to claim 1 wherein the integral radiator periphery (7) defines a clamped edge termination for the radiator (5).

4. A vehicle according to claim 3, wherein the clamped edge termination (7,16) is co-extensive with the integral radiator periphery (7, 16).

5. A vehicle according to claim 4, wherein the clamped edge termination (7,16) is formed by a stiffening rib (16) surrounding the radiator (5).

6. A vehicle according to claim 4, wherein the clamped edge termination (7,16) is defined by a step in thickness between the radiator (5) and the trim panel.

7. A vehicle according to claim 3, wherein the radiator (5) is stiffened by at least one rib (13) extending over its surface.

8. A vehicle according to claim 3, wherein a stiffening sheet (17) is applied to one surface of the radiator (5).

9. A vehicle according to claim 3, wherein the clamped edge termination (7, 16) is formed by a stiffening rib (16) surrounding the radiator (5).

10. A vehicle according to claim 3, wherein the clamped edge termination (7, 16) is defined by a step in thickness between the radiator (5) and the trim panel.

11. A vehicle according to claim 1, wherein the vibration exciter (6) is inertial.

12. A vehicle according to claim 1, wherein the vibration exciter (6) is electrodynamic.

13. A vehicle according to claim 1, wherein the trim panel (1) is a roof lining.

14. A vehicle according to claim 1, wherein the radiator (5) is stiffened by at least one rib (13) extending over its surface.

15. A vehicle according to claim 1, wherein a stiffening sheet (17) is applied to one surface of the radiator (5).

16. A trim panel (1) for a vehicle having a passenger compartment, the trim panel (1) comprising opposed skins (8) enclosing and laminated to a core (9), an integral resonant acoustic radiator (5) with a vibration exciter (6) mounted on the radiator (5) to launch bending waves into the radiator (5) to cause it to resonate to produce an acoustic output, and a radiator periphery (7, 16) integral with the radiator (5) and the surrounding trim panel (1), the radiator (5) having reduced thickness compared with the thickness of the trim panel (1) outside the radiator periphery (7, 16).

17. A trim panel according to claim 16, wherein the radiator (5) comprises a stiff lightweight panel.

18. A trim panel according to claim 16 wherein the integral radiator periphery (7, 16) defines a clamped edge termination for the radiator (5).

19. A trim panel according to claim 18, wherein the clamped edge termination (7,16) is co-extensive with the integral radiator periphery (7,16).

20. A trim panel according to claim 19, wherein the clamped edge termination (7,16) is formed by a stiffening rib (16) surrounding the radiator.

21. A trim panel according to claim 19, wherein the clamped edge termination (7,16) is defined by a step in thickness between the radiator (5) and the trim panel.

22. A trim panel according to claim 18, wherein the radiator (5) is stiffened by at least one rib (13) extending over its surface.

23. A trim panel according to claim 18, wherein a stiffening sheet is applied to one surface of the radiator (5).

24. A trim panel according to claim 18, wherein the clamped edge termination (7, 16) is formed by a stiffening rib (16) surrounding the radiator.

25. A trim panel according to claim 18, wherein the clamped edge termination (7, 16) is defined by a step in thickness between the radiator (5) and the trim panel.

26. A trim panel according to claim 16, wherein the vibration exciter (6) is inertial.

27. A trim panel according to claim 16, wherein the vibration exciter (6) is electrodynamic.

28. A trim panel according to claim 12, comprising a plurality of resonant radiators (5).

29. A trim panel according to claim 28, wherein the trim panel (1) is a vehicle roof lining for a passenger compartment and a resonant radiator is positioned adjacent to each passenger position.

30. A trim panel according to claim 16, wherein the radiator (5) is stiffened by at least one rib (13) extending over its surface.

31. A trim panel according to claim 16, wherein a stiffening sheet (17) is applied to one surface of the radiator (5).

32. A vehicle having a passenger compartment, a trim panel (1) lining at least a portion of the passenger compartment and comprising opposed skins (8) enclosing a core (9), and a loudspeaker in the trim panel (1) comprising an integral resonant acoustic radiator (5), a vibration exciter (6) mounted on the radiator (5) to launch bending waves into the radiator (5) to cause it to resonate to produce an acoustic output, and a radiator periphery (7) integral with the radiator (5) and the surrounding trim panel (1), wherein part of the panel is compressed to form the radiator (5) such that the radiator (5) has reduced thickness compared with the thickness of the trim panel (1) outside the radiator periphery (7).

33. A trim panel (1) for a vehicle having a passenger compartment, the trim panel (1) comprising opposed skins (8) enclosing a core (9), an integral resonant acoustic radiator (5) with a vibration exciter (6) mounted on the radiator (5) to launch bending waves into the radiator (5) to cause it to resonate to produce an acoustic output, and a radiator periphery (7, 16) integral with the radiator (5) and the surrounding trim panel (1), wherein part of the panel is compressed to form the radiator (5) such that the radiator (5) has reduced thickness compared with the thickness of the trim panel (1) outside the radiator periphery (7, 16).

* * * * *